United States Patent [19]

Poskie

[11] Patent Number: 5,070,808
[45] Date of Patent: Dec. 10, 1991

[54] TRANSMISSION POSITION INDICATOR WITH A COLUMNATED LIGHT SYSTEM

[75] Inventor: Fredrick R. Poskie, Plymouth, Mich.

[73] Assignee: General Motors Corporation, Detroit, Mich.

[21] Appl. No.: 604,314

[22] Filed: Oct. 29, 1990

[51] Int. Cl.⁵ .................. G09F 13/18; G09F 13/34
[52] U.S. Cl. .................. 116/28.1; 116/DIG. 20; 116/281
[58] Field of Search .............. 116/28.1, 243, 261, 116/262, 263, 281, 282, DIG. 20, DIG. 5, DIG. 26, 244, 302; 340/815.31; 350/110; 362/26

[56] References Cited
U.S. PATENT DOCUMENTS

| | | | |
|---|---|---|---|
| 3,622,772 | 11/1971 | Koiso | 116/262 |
| 3,647,986 | 3/1972 | Lace et al. | 360/106 |
| 3,677,619 | 7/1972 | Mackenzie | 350/110 |
| 3,868,923 | 3/1975 | Lambiris | 116/28.1 |
| 4,788,881 | 12/1988 | Owen et al. | 74/500.5 |

Primary Examiner—William A. Cuchlinski, Jr.
Assistant Examiner—W. Morris Worth
Attorney, Agent, or Firm—Donald F. Scherer

[57] ABSTRACT

A gear range indicator for use with automatic transmission which is remote from the shift mechanism, yet requires little or no adjustment to be made to the mechanical linkage to compensate for variations in the position of the display relative to the shift mechanism. The gear range indicator uses light conducting columns to illuminate symbols corresponding to the gear range selected. An opague indicator control strip with an aperture blocks light from teaching the columns except for that light passing through the aperture. The aperture is aligned with the column corresponding to the gear range selected.

5 Claims, 1 Drawing Sheet

U.S. Patent    Dec. 10, 1991    5,070,808
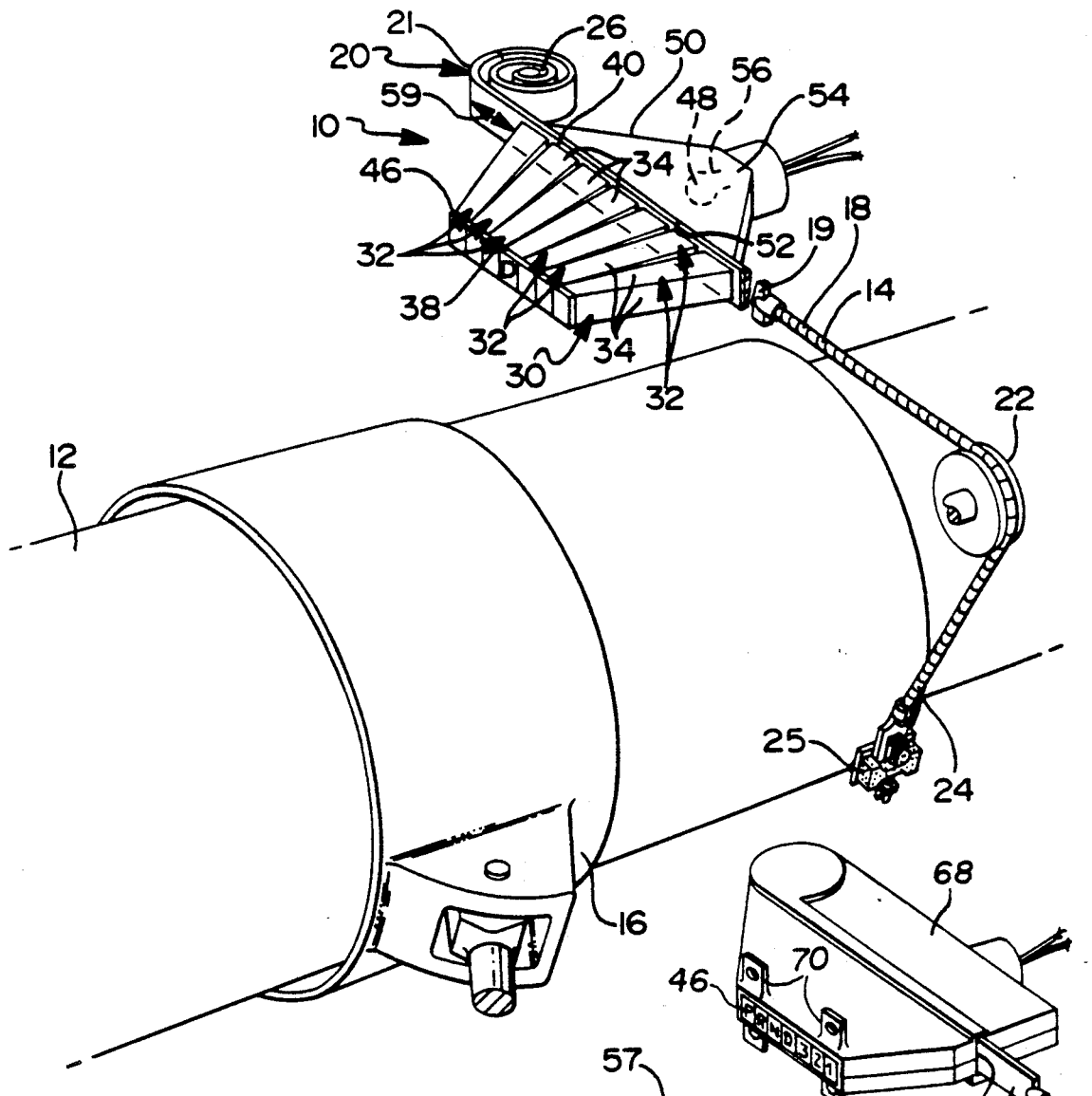
FIG 1
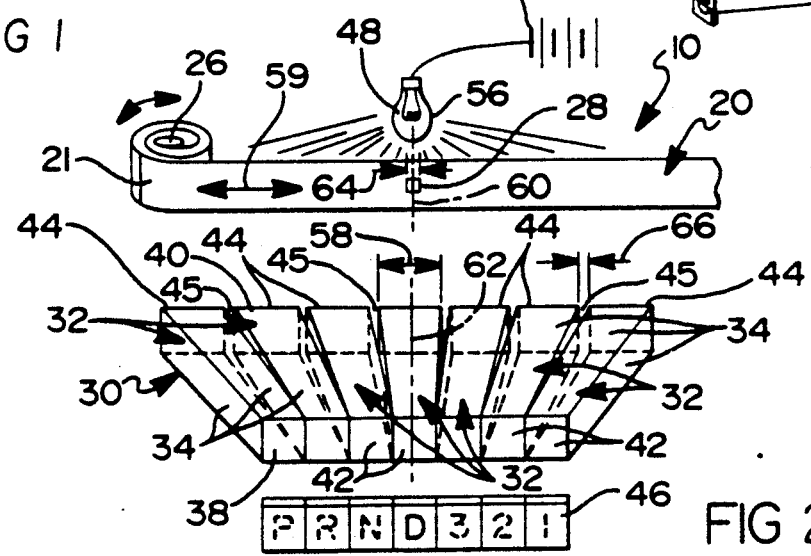
FIG 2
FIG 3

TRANSMISSION POSITION INDICATOR WITH A COLUMNATED LIGHT SYSTEM

TECHNICAL FIELD

This invention relates to gear range indicators for automatic transmissions in motor vehicles. More particularly, this invention relates to dash board mounted indicators linked to a shift mechanism through a mechanical linkage.

BACKGROUND OF THE INVENTION

Associated with an automatic transmission installed in a vehicle is a gear range indicator which displays the gear range selected by a vehicle operator using a shift mechanism.

Gear range indicators should provide a correct and discernible indication of the gear range selected. There may be difficulty in doing so, partly due to variations in the distance between the mounting location of the indicator and the location of the attachment point to the shift mechanism.

Prior art gear range indicators rely on adjustment of the effective length of a cable connecting the indicator with the shift mechanism to compensate for variations in position between the indicator and the shift mechanism attaching point. The methods of adjusting include pulling on the cable until the desired alignment is achieved and then tightening the cable in place on the shift mechanism, and rotating a threaded member with the cable attached to it relative to a stationary threaded member as in U.S. Pat. No. 4,788,881 issued to Owen et al. on Dec. 6, 1988 and assigned to the assignee of the present invention.

SUMMARY OF THE INVENTION

This invention minimizes the need to provide an adjustment of the effective length of the cable between the shift mechanism and the indicator. This invention also provides an illuminated display of the selected gear range. This is done using a plurality of light conducting columns, one for each gear range. Light is passed from a light source through the columns to an indicator panel. An indicator control strip with an aperture is interposed between the columns and the light source to allow only one column at a time to be illuminated. The ends of the columns closest to the light source, and the aperture in the indicator control strip, are sized to make variations in position of the aperture relative to the individual columns for a given gear range imperceptible to the vehicle operator.

It is an object of this invention to provide an improved gear range indicator which provides an indication of the gear range selected using light conducting columns with opaque light reflecting sides to selectively transmit light from a light source to an indicator panel bearing symbols for each of the available gear ranges, thereby illuminating the portion of the indicator panel which corresponds to the selected gear range using an indicator control strip made of opaque material and having an aperture through which light can pass interposed between the light source and the light conducting columns providing the means for selectively transmitting light.

It is also an object of this invention to provide an improved gear range indicator as set forth above with a rear side of the columnator abutting the indicator control strip, the relative sizes of the rear end of each of the columns being such that only one column at a time is illuminated.

It is yet further an object of this invention to provide an improved gear range indicator as set forth above with an adjustment mechanism for adjusting the aperture position relative to the positions of the light conducting columns.

These and other objects and advantages will be more apparent from the following description and drawings.

DESCRIPTION OF THE DRAWINGS

FIG. 1 is a perspective view of the gear range indicator as it would be positioned relative to a steering column mounted shift mechanism.

FIG. 2 shows the most important elements of the gear range indicator in a partially exploded view.

FIG. 3 is a drawing showing a perspective view of one embodiment of the gear range indicator.

DESCRIPTION OF THE PREFERRED EMBODIMENT

FIG. 1 shows the gear range indicator 10 oriented as it would be in a vehicle. The externals of a shift mechanism 16 are shown without showing the connection to a transmission. The gear range indicator 10 is shown as positioned above a steering column 12, as would be the case if the gear range indicator 10 were mounted in the dashboard (not shown) of the vehicle. A similar arrangement is found in U.S. Pat. No. 4,788,881 issued to Owen et al. on Dec. 6, 1988. A cable 14, serving as a means for mechanically connecting the gear range indicator 10 to the shift mechanism 16, is attached on a first end 18 to a first end 19 of an indicator control strip 20. The cable 14 passes over a sheave 22 or a drum (not shown) and attaches on a second end 24 to a shift mechanism 16. As an alternative, the second end 24 of the cable 14 could attach instead to an adjuster 25 which would be attached to a shift mechanism 16 as shown in '881. The shift mechanism 16 may be constructed similar to the column mounted shift mechanism shown in the U.S. Pat. No. 2,925,061 to Thornburgh et al. issued Feb. 16, 1960 and assigned to the assignee of the present invention.

A torsion spring 26 is used as a tensioning mechanism in the present invention in place of the tension spring shown '881. The indicator control strip 20 has an aperture 28. A second end 21 of the indicator control strip 20 is connected to the torsion spring 26.

FIG. 2 shows the gear range indicator 10 in more detail in an exploded view. A light columnator 30 for conducting light has a plurality of light conducting columns 32, with one column 32 for each available gear shift range. The light columnator 30 is constructed of transparent material, each column 32 having light reflecting opaque walls 34, or covered with a light reflecting opaque material (not shown) to aid in channeling light. The light columnator 30 has a front end 38 and a rear end 40. The individual columns 32 have corresponding front ends 42 and rear ends 44. The columnator 30 has gaps 45 between each of the columns 32 at the rear end 40 which are at least as wide as the aperture 28.

The front end 42 of each column 32 of the columnator 30 is covered by an indicator panel 46 made of a translucent material and marked with symbols or indicia for each of the available gear ranges - "P" for Park, "R" for Reverse, "N" for Neutral, "D" for Drive, "3", "2", and "1" for other forward drive ranges.

A light source 48 is mounted in a reflective hood 50 surrounding the light source 48. The hood 50 has an open end 52 with a shape complementary to the rear end 40 of the columnator 30. The light source 48 is mounted in the closed end 54 of the hood 50. The open end 52 of the hood 50 attaches to the rear end 40 of the columnator 30. The light source 48 is provided by a light bulb 56, or alternatively, a light emitting diode (not shown). The light source 48 is connected to a voltage source 57.

The indicator control strip 20 is interposed between the light columnator 30 and the light source 48. The indicator control strip 20 will be constructed of a pliable opaque material. An aperture 28 in the indicator control strip 20 is aligned with the rear end 44 of the column 32 which corresponds to the selected gear range. The first end 19 of the indicator control strip 20 is attached to the first end 18 of the cable 14. Tension on the indicator control strip 20 is maintained using spring force supplied by the torsion spring 26, or by an alternative tensioning mechanism, connected to a second end 21 of the indicator control strip 20. The indicator control strip 20 abuts the rear end 40 of the columnator 30, restricting the light impinging on the rear end 40 of the columnator 30 to a pattern essentially the same size and shape as the aperture 28 in the indicator control strip 20.

The indicator control strip 20 travels in a channel 61. The channel 61 provides clearance allowing the indicator control strip 20 to move so that the aperture can translate along a path 59 between the locations of the rear ends 44 of the columns 32. The channel 61 restricts movement of the aperture to the path 9 and prevents the indicator control strip 20 from moving away from the columnator 30. The channel 61 would be constructed in a conventional manner so as to provide the above described function.

Optimally, each column rear end 44 in the columnator 30 will have a width 58 of at least six times the standard deviation of the distance of the center 60 of the aperture 28 from the center 62 of the rear end 44 of the column 32 for a given gear range plus the aperture width 64. The gap width 66 at a minimum is equal to the aperture width 64. The rear ends 44 of the columns 32 are to be centered at the nominal positions of the aperture 28 for each gear range. If the above specified rear end widths 58 would interfere with one another, or the resultant gap width 6 would be less than the aperture width 64, then the aperture width 64 in the indicator control strip 20 could be narrowed to reduce both the required rear end width 58 of the columns 32 and the gap width 66. Alternatively, one would reduce the rear end width 58 and adjust the effective length of the cable 14 as required as is done with a pointer type gear range indicator as shown in U.S. Pat. No. 4,788,881 issued to Owen et al. on Dec. 6, 1988.

An enclosure 68 for the gear range indicator would be used to hold the columnator 30, the indicator panel 46, the light source 48, the torsion spring 26, the channel 61, the reflective hood 50, and the indicator control strip 20 in their desired relative positions. The enclosure 68 also provides attaching provisions 60 for mounting the gear range indicator 10 to the vehicle. The enclosure 68 would be made in accordance with prevailing practices for gear range indicators.

The objects and advantages of this invention can be more readily understood by considering how all of these elements interact.

The gear gear range indicator 10 is installed by mounting it to a rigid location in the vehicle through the enclosure 68 for the gear range indicator 10. The cable 14, fixed to the indicator control strip 20, is pulled over the sheave 22 and attached to the shift mechanism 16. As the cable 14 is pulled, an opposing tensile force is exerted on the indicator control strip 20 by the torsion spring 26. The aperture 28 in the indicator control strip 20 is aligned with the column 32 corresponding to the gear range in which the shift mechanism 16 is presently placed.

The light source 48 is illuminated by connecting it to the voltage source 57. Light passes from the light source 48 through the aperture 28 and impinges on the rear end 44 of the column 32 corresponding to the gear range in which the shift mechanism 16 is presently placed. Light is then conducted through the column 32 to the front end 42 of the column 32 where it impinges on the indicator panel 46. Light reflecting opaque walls 34 aid in channeling light to the indicator panel 46 while preventing leakage of light to adjacent columns. The light reflecting opaque walls 34 also prevent leakage of light into and out of the columnator 30. The illumination of the part of the indicator panel 46 in line with the column 32 corresponding to the selected gear range provides the vehicle operator with the identification of the selected gear range.

The channel 61 enclosing the indicator control strip 20 between the light columnator 30 and the reflecting hood 50 blocks light from entering and exiting the columnator 30 at the interface of the columnator 30 to the open end 52 of the reflecting hood 50. The channel 61 also holds the indicator control strip close to the rear end of the columnator. Provisions are also made to prevent light from escaping between the light source and the indicator control strip, and to avoid diminishing the intensity of the light transmitted to the columns, by sealing the light source relative to the columnator.

In shifting from one gear range to another, the shift mechanism 16 moves a portion of the cable 14 attached to it 16. Starting in the Park range, the shift mechanism 16 is moved to the Drive range. Before the shift mechanism 16 moves, the aperture 28 is aligned with the column 32 corresponding to the part of the indicator panel 46 with a "P" on it. The "P" on the indicator panel 46 is illuminated. As the shift mechanism 16 is moved along a continuum from "P" to "D", the cable 14 pulls the indicator control strip 20 which translates in the direction of the cable 14 along the channel 61. The aperture 28 moves from the Park column, following the path 59 between the rear ends 44 of the columns 32, with the indicator panel 46 alternately going from dark to having the "R" and the "N" portions of the indicator panel illuminated. When the shift mechanism 16 is placed in the Drive position, the "D" portion of the indicator panel 46 is illuminated.

Obviously, many modifications and variations of the present invention are possible in view of the above teaching. It is therefore to be understood that, within the scope of the appended claims, the invention may be practiced otherwise than as specifically described.

I claim:

1. A gear range indicator for an automatic transmission in a vehicle with an operator controlled shift mechanism for shifting the transmission between gear ranges and means for mechanically connecting the gear range indicator to the shift mechanism, the gear range indicator comprising:

an indicator control strip, constructed of a pliable opaque material and having an aperture through which light can pass, connected on a first end to the means for mechanically connecting the gear range indicator to the shift mechanism and connected on a second end to a tensioning spring, displaced when the shift mechanism is shifted, having the first end pulled against the urging of the tensioning spring on the second end;

a light source;

an indicator panel made of translucent material, and bearing a symbol for each available transmission gear range;

a light columnator having a rear end abutting the indicator control strip and a front end abutting the indicator panel, fixed relative to the light source, the light source illuminating the rear end through the aperture in the indicator control strip, the light columnator including:

a plurality of columns of transparent material for conducting light from the rear end to the front end, the number of columns equal to the number of transmission gear ranges, each column having light reflecting opaque walls, both the front end and the rear end of each column being transparent to allow the transmission of light from the light source to the indicator panel, the front end of each column being aligned with one of the symbols of the indicator panel, and gaps between each column at the rear end; and the indicator control strip being slidably disposed between the light columnator and the light source, thereby allowing the aperture to move to the column corresponding to the selected gear range.

2. A gear range indicator for an automatic transmission in a vehicle with an operator controlled shift mechanism for shifting the transmission between gear ranges; a cable connected on a first end to the gear range indicator and connected on a second end to the shift mechanism; the gear range indicator comprising:

an indicator control strip, constructed of a pliable opaque material and having an aperture through which light can pass, connected on a first end to the cable and connected on a second end to a tensioning spring, displaced when the shift mechanism is shifted, having the first end pulled against the urging of the tensioning spring the second end;

a light source;

an indicator panel made of translucent material and bearing indicia representing each available transmission gear range;

a light columnator having a rear end abutting the indicator control strip and a front end abutting the indicator panel, fixed in position relative to the light source, the light source illuminating the rear end through the aperture in the indicator control strip, the light columnator comprising:

a plurality of columns of transparent material for conducting light from the rear end to the front end, the number of columns equal to the number of transmission gear ranges, each column having light reflecting opaque walls, both the front end and the rear end of each column being transparent to allow the transmission of light from the light source to the indicator panel, the front end of each column being aligned with one of the gear range indicia of the indicator panel, gaps between each column at the rear end, the columns widths and relative locations and gap widths at the rear end of the columnator being such that only the gear range indicia on the indicator panel corresponding to the gear range selected is illuminated by light from the light source passing through the aperture in the indicator control strip, and the columns tapering from the width at the rear end to the width at the front end; and the indicator control strip being disposed for selective movement between the light columnator and the light source, thereby allowing the aperture to move to the column corresponding to the selected gear range, the indicator control strip blocking light from passing from the light source to the columns except for light passing through the aperture.

3. A gear range indicator as recited in claim 2, further comprising:

a reflective hood surrounding the light source, having an open end and a closed end opposing one another, the open end being of a shape and size complementary to the rear end of the columnator, aligned with the columnator at the open end, the light source mounted in the closed end;

a channel slidably supporting the indicator control strip and providing means for the indicator control strip to be slidably disposed relative to the light source and the columnator and simultaneously providing means for the indicator control strip to abut the columnator; and an enclosure retaining and supporting the columnator, indicator panel, light source, the reflective hood, the indicator control strip, the tensioning mechanism, and the channel together in their desired relative positions while allowing the indicator control strip to translate and also providing attaching provisions for mounting the gear range indicator.

4. A gear range indicator as recited in claim 3, further comprising:

means for adjusting the effective length of the cable, thereby adjusting the aperture position relative to the position of the columns of the light columnator.

5. A gear range indicator for an automatic transmission in a vehicle with an operator controlled shift mechanism for shifting the transmission between gear ranges; a cable connected on a first end to the gear range indicator and connected on a second end to the shift mechanism; the gear range indicator comprising:

an indicator control strip, constructed of a pliable opaque material and having an aperture through which light can pass, connected on a first end to the cable and connected on a second end to a tensioning spring, displaced when the shift mechanism is shifted, having the first end pulled against the urging of the tensioning spring on the second end;

a light source;

an indicator panel made of translucent material and bearing a symbol for each available transmission gear range;

a light columnator having a rear end abutting the indicator control strip and a front end abutting the indicator panel, fixed in position relative to the light source, the light source illuminating the rear end through the aperture in the indicator control strip, the light columnator including:

a plurality of columns of transparent material for conducting light from the rear end to the front end, the number of columns equal to the number of transmission gear ranges, each column having light reflecting opaque walls, both the front end and the rear end of each column being transparent to allow the transmission of light from the light source to the indicator panel, the front ends being of uniform size and shape and aligned with one of the symbols of the indicator panel, the rear ends aligned with the locations of the aperture of the indicator control strip for each of the corresponding gear shift range positions;

the rear ends of the columns having widths at least six times a standard deviation of a distance between the center of the aperture and the center of the rear end of the column for the corresponding gear range plus the width of the aperture, a gap between each column rear end having a width at least the width of the aperture; and the columns tapering from the rear end to the front end; and the indicator control strip being slidably disposed between the light columnator and the light source, thereby allowing the aperture to move to the column corresponding to the selected gear range, the indicator control strip blocking light from passing from the light source to the columns except for light passing through the aperture;

a reflective hood surrounding the light source, having an open and a closed end opposing one another, the open end being of the same shape and size as the rear end of the columnator, aligned with the columnator at the open end, the light source mounted in the closed end;

a channel slidably supporting the indicator control strip and providing means for the indicator control strip to be slidably disposed relative to the light source and the columnator and simultaneously providing means for the indicator control strip to abut the columnator; and an enclosure retaining and supporting the columnator, indicator panel, light source, the reflective hood, the indicator control strip, the spring, and the channel together in their desired relative positions while allowing the indicator control strip to translate and the spring to be deformed and also providing attaching provisions for mounting the gear range indicator.

* * * * *